United States Patent [19]

Parisi et al.

[11] 4,201,968
[45] May 6, 1980

[54] TEMPERATURE PROBE ASSEMBLY

[75] Inventors: Michael S. Parisi; John A. Pauly, both of Milford, Mass.

[73] Assignee: Walter Kidde & Co., Inc., Clifton, N.J.

[21] Appl. No.: 934,032

[22] Filed: Aug. 16, 1978

[51] Int. Cl.² .............................................. H01C 7/04
[52] U.S. Cl. ...................................... 338/28; 73/352; 219/10.55 E
[58] Field of Search .................... 338/28, 30, 25, 229; 219/10.55 E, 10.55 D, 10.55 R; 73/352, 398 AR; 29/612

[56] References Cited
U.S. PATENT DOCUMENTS 4,038,510  7/1977  White ............................ 219/10.55 E Primary Examiner—C. L. Albritton
Attorney, Agent, or Firm—John E. Toupal

[57] ABSTRACT

The invention is a temperature probe assembly including a probe for insertion into food products and comprising a temperature responsive sensor. Secured to the probe is a coaxial cable having electrically isolated inner and outer conductors connected to the temperature responsive sensor and an outer insulative sheath. The insulative sheath is discontinuous so as to create at a plurality of spaced apart locations on the cable insulation gaps in which a length of the outer conductor is exposed. Molded over each of the insulation gaps and bonded intimately to each of the exposed lengths of the outer conductor is an insulative unit. In response to a predetermined relative movement between an insulative unit and the insulative sheath, the attached length of outer conductor is severed to open an electrical circuit.

8 Claims, 2 Drawing Figures

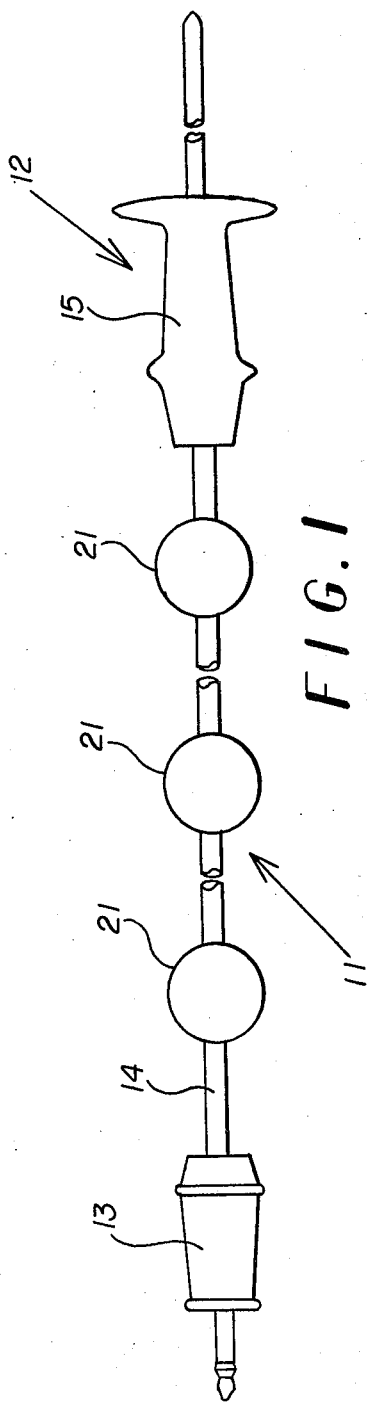
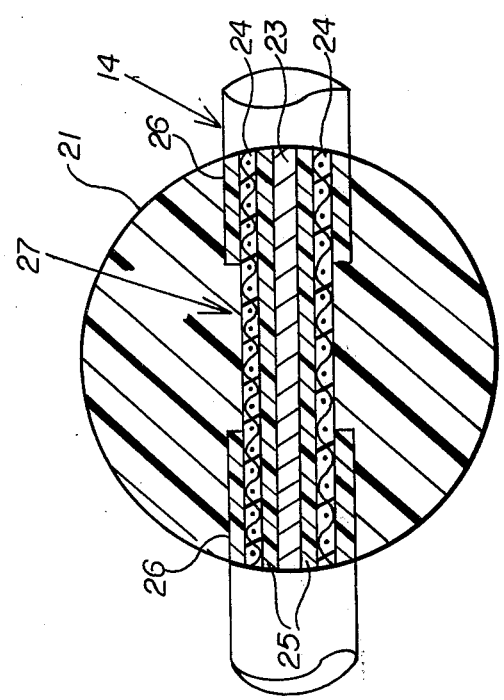

TEMPERATURE PROBE ASSEMBLY

BACKGROUND OF THE INVENTION

This invention relates generally to a temperature probe assembly and more particularly to a temperature probe assembly for monitoring the temperature of food being prepared in microwave ovens.

Many conventional microwave ovens are equipped with temperature probes for monitoring food being prepared. Typically, the probe assemblies include a thermistor probe connected by a coaxial cable to an oven control that initiates various operations such as reducing heating power, terminating a heating cycle, terminating a microwave heating cycle and initiating a radiant heating cycle, etc. One of the disadvantages of such probe assemblies is that the coaxial cables employed can become inadvertently lodged between an oven door and a door frame thereby preventing a tight closure therebetween. Obviously, such an occurrence can lead to hazardous leakage of microwave energy.

A technique derived for eliminating the above problem entails the molding of plastic spheres to a coaxial cable at spaced apart locations between a probe and an oven control. The spacing between the spheres is such so as to prevent a discrete length of cable from becoming lodged between the door and door frame. In the event that a sphere becomes so lodged, the diameter of the sphere is sufficiently large to prevent actuation of the oven doors latch mechanism. Consequently, microwave leakage cannot occur around the edge of a door held partially open by the coaxial cable of the probe. Although substantially alleviating the leakage problem, prior molded spheres exhibited a tendency to move along the surface of the coaxial cable when subjected to substantial forces. As a result of such movement, a pair of spheres can become sufficiently separated to permit an intermediate length of coaxial cable to become lodged between a door and a door frame and thereby give rise to the possibility of microwave leakage.

The object of this invention, therefore, is to provide an improved temperature control probe assembly that eliminates the possibility of microwave oven operation with a portion of the probe assembly lodged between an oven door and door frame.

SUMMARY OF THE INVENTION

The invention is a temperature probe assembly including a probe for insertion into food products and comprising a temperature responsive sensor. Secured to the probe is a coaxial cable having electrically isolated inner and outer conductors connected to the temperature responsive sensor and an outer insulative sheath. The insulative sheath is discontinuous so as to create at a plurality of spaced apart locations on the cable insulation gaps in which a length of the outer conductor is exposed. Molded over each of the insulation gaps, and bonded intimately to each of the exposed lengths of the outer conductor is an insulative unit. In response to a predetermined relative movement between an insulative unit and the insulative sheath, the attached length of outer conductor is severed to open an electrical circuit.

In a preferred embodiment of the invention, the insulative units are substantially spherical and evenly spaced along the cable. Also, the outer conductor comprises braided strands of electrically conductive material.

The invention also constitutes a method for forming a temperature probe assembly. The method includes the steps of providing a length of coaxial cable having electrically isolated inner and outer conductors covered by an insulative sheath, securing one end of the cable to a probe having a temperature responsive sensor connecting the inner and outer conductors to the sensor, stripping away the insulative sheath at spaced apart locations on the cable to create gaps in which a length of the outer conductor is exposed, and molding an insulative unit to the insulative sheath so as to cover each of the gaps and create an intimate bond between each unit and the length of outer conductor covered thereby.

DESCRIPTION OF THE DRAWINGS

These and other objects and features of the present invention will become more apparent upon the perusal of the following description taken in conjunction with the accompanying drawings wherein:

FIG. 1 is a partial schematic view illustrating a probe assembly according to the present invention; and FIG. 2 is a cross-sectional view of one of the protective spheres shown in FIG. 1.

DESCRIPTION OF THE PREFERRED EMBODIMENT

Referring now to FIG. 1 there is shown a probe assembly 11 including a temperature probe 12 connected to an electrical connector 13 by a coaxial cable 14. The probe 12 includes a handle portion 15 and a bayonet housing portion 16 for insertion into a food product being cooked. The probe housing 16 retains a temperature sensing thermistor 17 having one lead 18 connected to an inner conductor of the coaxial cable 14 and a second lead 19 connected to the probe housing 16 and an outer conductor of the cable 14. Molded around spaced apart locations on the cable 14 are a plurality of plastic spheres 21, one of which is shown in cross-section in FIG. 2, it being understood that all of the spheres 21 are identical.

As shown in FIG. 2, the cable 14 includes an inner conductor 23 and a coaxial hollow cylindrical outer conductor 24 separated by an electrically insulative coating 25. The outer conductor 24 is porous and formed, for example, by braiding strands of electrically conductive material such as silver plated copper. Enclosing and electrically isolating the outer conductor 24 is an insulative sheath 26 formed of a suitable insulative material such as silicone rubber.

During fabrication of the probe assembly 11, annular bands of the insulative sheath 26 are stripped from the cable 14 at spaced apart locations thereon to form a plurality of insulator gaps 27, one of which is shown in FIG. 2. The insulator gaps result in the formation of discrete cable lengths in which the outer conductor 24 is exposed. Subsequently, each of the gaps is covered by one of the insulated sphere units 21 which are molded over the insulative sheath 26. During the molding process, the pressure and temperature of the plastic, for example, polypropylene, is controlled to insure impregnation of the porous outer conductor 24 and thereby create an intimate bond therewith.

During typical use of the assembly 11, the electrical connector 13 is connected to a control unit (not shown) of a microwave oven (not shown) and the probe 12 is used to monitor the temperature of foods being prepared. The spheres 21 have a diameter, typically greater than 0.6 inches and a spacing, for example, 2 inches, that prevents inadvertent operation of the oven with its door not tightly closed as described hereinbefore. However, in the event that sufficient force is applied to any of the spheres 21 to produce a predetermined degree of movement, for example ¼ inch, along the insulative sheath 26, the intimate bonding between the sphere 21 and the porous outer conductor 24 results in severing thereof. This in turn interrupts current flow through the probe and causes the control unit to prevent energization of the oven's microwave unit. Thus, the probe assembly 11 interrupts microwave operations in the event that a pair of the spheres 21 are separated. This prevents oven operation with a discrete intermediate section of the cable 14 lodged between an oven door and door frame.

Obviously, many modifications and variations of the present invention are possible in light of the above teachings. It is therefore to be understood that within the scope of the appended claims the invention can be practised otherwise than as specifically described.

What is claimed is:

1. A temperature probe assembly comprising:
    a probe adapted for insertion into food products, said probe comprising a temperature responsive sensor;
    a coaxial cable having one end secured to said probe and having electrically isolated inner and outer conductors connected to said temperature responsive sensor and an outer insulative sheath, said insulative sheath being discontinuous so as to create at a plurality of spaced apart locations on said cable insulation gaps in which a length of said outer conductor is exposed;
    an insulative unit molded over said insulative sheath and covering each of said gaps, each of said insulative units being bonded intimately to each of said exposed lengths of said outer conductor, so as to cause severing thereof in response to a predetermined relative movement between the insulative unit bonded thereto and said insulative sheath; and
    an electrical plug connected to the opposite end of said cable.

2. An assembly according to claim 1 wherein said insulative units project substantially beyond the surface of said insulative sheath.

3. An assembly according to claim 2 wherein said insulative units are substantially spherical.

4. An assembly according to claim 3 wherein said outer conductor comprises braided strands of electrically conductive material.

5. An assembly according to claim 4 wherein said insulative units are substantially evenly spaced along said cable.

6. A method for forming a temperature probe assembly comprising the steps of:
    providing a length of coaxial cable having electrically isolated inner and outer conductors covered by an insulative sheath;
    securing one end of said cable to a probe having a temperature responsive sensor;
    connecting said inner and outer conductors to said sensor;
    stripping away said insulative sheath at spaced apart locations on said cable to create gaps in which a length of said outer conductor is exposed;
    molding an insulative unit to said insulative sheath so as to cover each of said gaps, said molding step comprising bonding said unit covering each gap to said length of outer conductor therein; and
    connecting an electrical plug to the opposite end of said cable.

7. A method according to claim 6 wherein said molding step comprises molding over each of said gaps an insulative unit projecting substantially beyond the surface of said insulative sheath.

8. A method according to claim 7 wherein said stripping step comprising creating said gaps at substantially evenly spaced locations along said cable.

* * * * *